(12) United States Patent
Hecht

(10) Patent No.: US 8,534,966 B2
(45) Date of Patent: Sep. 17, 2013

(54) CUTTING TOOL HAVING RELEASABLY MOUNTED SELF-CLAMPING CUTTING HEAD

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 980 days.

(21) Appl. No.: 12/616,504

(22) Filed: Nov. 11, 2009

(65) Prior Publication Data

US 2010/0143059 A1    Jun. 10, 2010

(30) Foreign Application Priority Data

Dec. 9, 2008 (IL) .......................... 195804

(51) Int. Cl.
*B23B 51/02* (2006.01)
(52) U.S. Cl.
USPC ........................... 408/231; 408/226; 408/230
(58) Field of Classification Search
USPC .................. 408/226, 230, 227, 231
See application file for complete search history.

(56) References Cited

U.S. PATENT DOCUMENTS

| 5,228,812 | A | | 7/1993 | Noguchi et al. | |
|---|---|---|---|---|---|
| 6,059,492 | A | * | 5/2000 | Hecht | 408/144 |
| 6,506,003 | B1 | * | 1/2003 | Erickson | 408/226 |
| 7,048,480 | B2 | * | 5/2006 | Borschert et al. | 408/144 |
| 7,306,410 | B2 | | 12/2007 | Borschert et al. | |
| 7,407,440 | B2 | | 8/2008 | White | |
| 7,591,617 | B2 | * | 9/2009 | Borschert et al. | 408/226 |
| 2003/0219321 | A1 | * | 11/2003 | Borschert et al. | 408/230 |
| 2005/0089382 | A1 | | 4/2005 | Stojanovski | |
| 2008/0193237 | A1 | * | 8/2008 | Men et al. | 408/226 |

FOREIGN PATENT DOCUMENTS

| EP | 1306153 A1 | 5/2003 |
|---|---|---|
| EP | 1338364 A2 | 8/2003 |
| EP | 1432542 A1 | 6/2004 |
| WO | 20080099379 | 8/2008 |

OTHER PUBLICATIONS

International Search Report dated Apr. 6, 2010 issued in corresponding Int'l Appln No. PCT/IL2009/001093 filed Nov. 19, 2009.

* cited by examiner

*Primary Examiner* — Jermie Cozart
(74) *Attorney, Agent, or Firm* — Womble Carlyle

(57) ABSTRACT

A cutting tool has a tool shank and a replaceable cutting head resiliently secured to the tool shank by an interference fit between a male fixation member of the cutting head and a female fixation member of the tool shank. The male fixation member has a resilience slit. In each cross section of the cutting tool taken perpendicular to an axis of rotation of the cutting tool through mutual abutment regions, the cross sectional profiles of the mutual abutment regions are arcuate sectors.

22 Claims, 5 Drawing Sheets

CUTTING TOOL HAVING RELEASABLY MOUNTED SELF-CLAMPING CUTTING HEAD

FIELD OF THE INVENTION

The current invention relates to a cutting tool having a releasably mounted cutting head.

BACKGROUND OF THE INVENTION

A drill having a releasably mounted cutting head is disclosed in U.S. Pat. No. 5,228,812. In a first embodiment disclosed in U.S. Pat. No. 5,228,812 the drill has an insert portion for cutting a workpiece and a shank portion, the insert portion being separably mechanically connected to the shank portion. The insert and shank portions have mutually engaging portions forming the connection between the insert and the shank, and a slit formed in either the insert or shank engaging portion. The insert portion and the shank portion are connected with each other using an elastic force which is caused by an elastic deformation upon mutual movement of the opposite surfaces of the slit in an engaging state of both portions, whereby the insert portion may be connected with or fixed to the shank portion by press-fitting the insert portion into the shank portion. In the connected state, the insert is fixed to the shank by frictional force between the side portions of the held portion of the insert and the inner end surfaces of holding portions of the shank.

The drill disclosed in U.S. Pat. No. 5,228,812 is often called a spade drill which is characterized by an insert portion (i.e., the cutting portion, or cutting head) having a basically flat shape with two opposing parallel flat surfaces which is received in a corresponding flat gap formed in the shank. The insert portion and shank portion are brought into engagement by relative axial displacement of the two components as they are brought together. The insert portion is made of a hard material such as a surface coated cemented carbide and the shank is made of steel. In order to insure a required accuracy of the opposing parallel flat surfaces, the flat surfaces may be ground. The grinding operation requires two grinding operations, one when grinding one flat surface, and another when grinding the other flat surface. Between the two grinding operations, the insert portion has to be rotated by 180° in order to present the non-ground flat surface to the grinding wheel, which may introduce an inaccuracy in the positioning of the non-ground flat surface relative to the grinding wheel.

U.S. Pat. No. 7,306,410 discloses a rotary cutting tool, e.g. a twist drill, having a tool head made of a hard cutting material, e.g. tungsten carbide, and a tool shank made of a high-speed tool steel or another metal material. The tool head has a fixing peg that is coaxial with the axis of rotation of the tool and which is in the shape of a truncated cone that tapers toward the tool shank with the axis of rotation as the cone axis. Two spiral flutes divide the surface of the fixing peg into two truncated conical generated surfaces that lie essentially diametrically opposite each other. The tool shank clamps the replaceable tool head in position on its holding end between the facing flanks of two clamping extensions which project essentially in the axial direction from the tool shank. The conical generated surfaces of the fixing peg are, in the clamping position, pressed by the facing flanks of the two clamping extension of the tool shank. The inner flanks which face each other of the clamping extensions are realized in a concave shape corresponding to the convex truncated cone generated surfaces of the fixing peg, so that in the fixing position they press with their entire surfaces against the truncated cone generated surfaces of the fixing peg.

In an exemplary embodiment illustrated in U.S. Pat. No. 7,306,410 a clamp fixing screw screwed in from the peripheral side of the tool shank runs through the fixing peg and the clamping extensions that clamp it in position. The clamp fixing screw not only represents a positive-fit connection between the clamping extensions and the fixing peg, but also increases the clamping pressure which is exerted radially by the clamping extensions on the truncated cone generated surfaces of the peg. In an exemplary embodiment, the clamp fixing screw lies inside a slot, the axis of rotation of which runs diametrically, and which slot runs radially inside the fixing peg and is open toward the tapered end of the fixing peg. The requirement of a clamp fixing screw introduces an extra complication and longer set up time when securing the replaceable tool head to the tool shank.

SUMMARY OF THE INVENTION

According to embodiments of the present invention there is provided a cutting tool having an axis of rotation around which the cutting tool rotates in a direction of rotation. The cutting tool comprises a tool shank and a replaceable self-clamping cutting head resiliently secured to the tool shank at a tool shank forward end by an interference fit between a male fixation member of the cutting head and a female fixation member of the tool shank. The male and female fixation members are each configured to have abutment regions, the abutment regions on the two fixation members mutually abutting one another. The male fixation member has a resilience slit, and in each cross section of the cutting tool taken perpendicular to the axis of rotation through mutual abutment regions between the male and female fixation members the cross sectional profiles of the mutual abutment regions are mutual arcuate sectors.

In accordance with some embodiments, either the cutting head or the tool shank may be made of cemented carbide. In accordance with other embodiments, both the cutting head and the tool shank may be made of cemented carbide.

In accordance with some embodiments, the cutting head comprises a cutting portion and a cutting head coupling portion forming a one-piece single unitary part with the cutting portion, the cutting head coupling portion comprises the male fixation member extending in a rearward direction of the cutting portion and terminating in a cutting head bottom surface. The resilience slit divides the male fixation member into two male fixation segments each having a cutting head major fixation wall forming a peripheral surface bounded by the resilience slit. The resilience slit opens out to the cutting head major fixation walls at side apertures and to the cutting head bottom surface at a bottom aperture. The side apertures and the bottom aperture meet at bottom aperture ends, the bottom aperture ends are adjacent, but not coincident with, rotationally trailing edges of respective head flutes.

In accordance with embodiments of the present invention, the tool shank is provided, at its forward end, with a protruding portion having two rotationally spaced apart protrusions extending forwardly from a tool shank bottom surface, and the cutting head bottom surface does not abut the tool shank bottom surface.

According to some embodiments, a transmission member protrudes from a rotationally trailing surface of the cutting head, the transmission member having an upper surface facing in an axially forward direction, a base surface facing in an axially rearward direction, and a cutting head torque transmission wall generally facing opposite the direction of rotation and located between the upper and base surfaces. The tool shank is provided, at the tool shank forward end, with a protruding portion having two rotationally spaced apart protrusions extending forwardly from a tool shank bottom surface, each protrusion comprises a lower protruding portion and an upper protruding portion, the lower protruding portion has an axially forwardly facing axial support surface from which the upper protruding portion extends in an axially forward direction, the upper protruding portion and the lower protruding portion form a transmission member receiving recess comprising a tool shank torque transmission wall generally facing the direction of rotation and an axially facing axial support surface.

In accordance with some embodiments, the cutting head torque transmission wall abuts the tool shank torque transmission wall and the base surface of the transmission member abuts the axial support surface providing axial support to the cutting head.

In accordance with some embodiments, the upper protruding portion comprises a lower surface generally facing the axial support surface, the tool shank torque transmission wall being located between the lower surface and the axial support surface, and the upper surface of the transmission member does not abut the lower surface of the upper protruding portion.

In another aspect, the present invention is directed to a self-clamping cutting head.

BRIEF DESCRIPTION OF THE DRAWINGS

For a better understanding of the present invention and to show how the same may be carried out in practice, reference will now be made to the accompanying drawings, in which.

Figure 1:
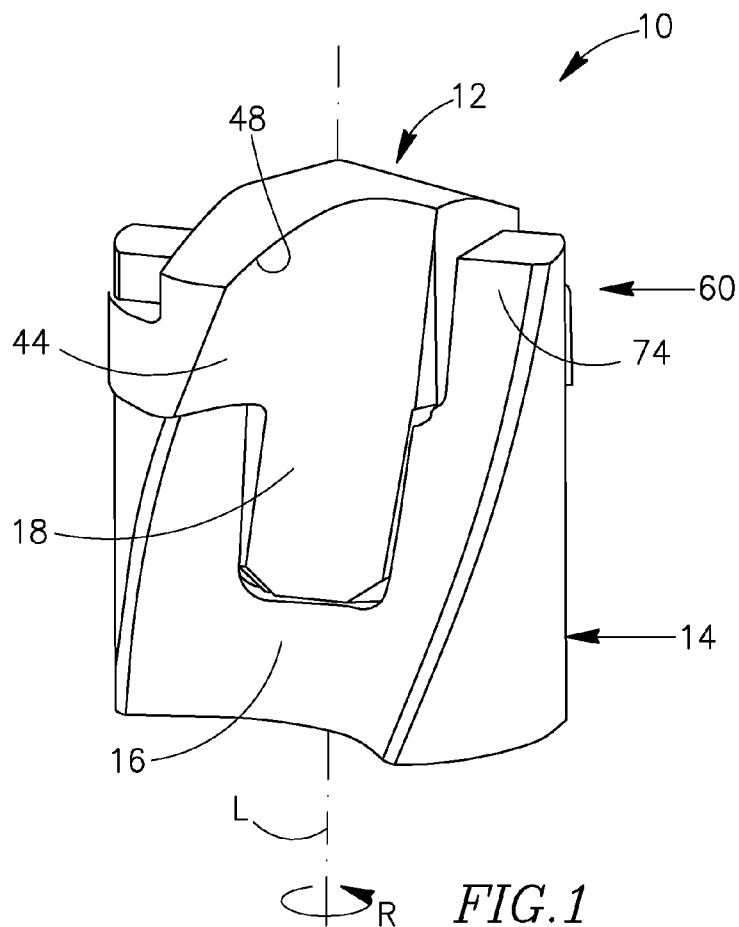
FIG. 1 is a perspective view of a cutting tool according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is made to FIG. 1 showing a cutting tool 10 in accordance with embodiments of the present invention. The cutting tool 10 may be a drill, or any other kind of rotary cutting tool. The cutting tool 10 includes a cutting head 12 releasably mounted in a self-clamping manner on a tool shank 14 with the cutting head 12 and the tool shank 14 having a common axis of rotation L around which the cutting tool 10 rotates in a direction of rotation R. The cutting head 12 may be of the sort used in metal cutting operations and thus can be termed a metal cutting head meaning that the cutting head may be used for cutting metal, not necessarily that the cutting head is made of metal. In accordance with some embodiments, the cutting head 12 may be made of hard wear resistant material such as cemented carbide, and the tool shank 14 may be made of steel or of another metal or metal compound. In accordance with some embodiments, the cutting head 12 may be made of a hard wear resistant material such as cemented carbide, and the tool shank 14 may also be made of a hard wear resistant material such as cemented carbide. The tool shank 14 may be provided with one or more axially extending shank flutes 16, each of which is fed from a corresponding head flute 18. The shank and head flutes 16, 18 join to form a tool flute for leading away chips cut from a workpiece.

Figure 2:
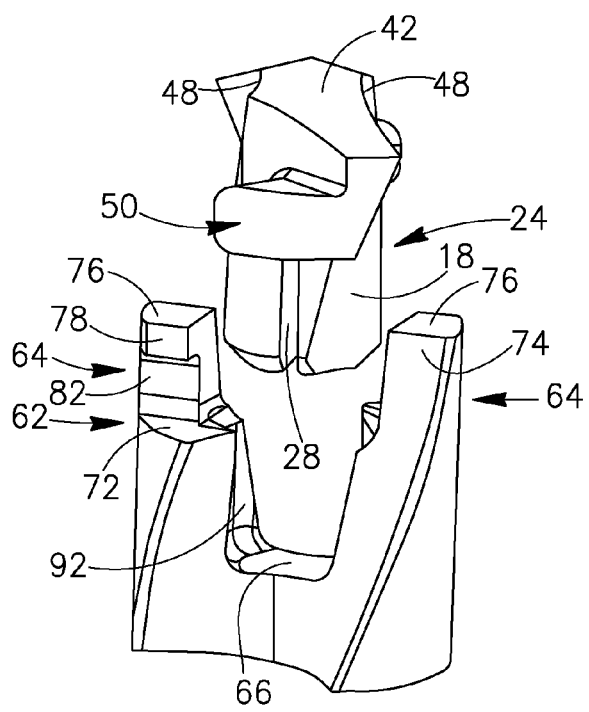
FIG. 2 is an exploded perspective view of the cutting tool of FIG. 1.
Figure 3:
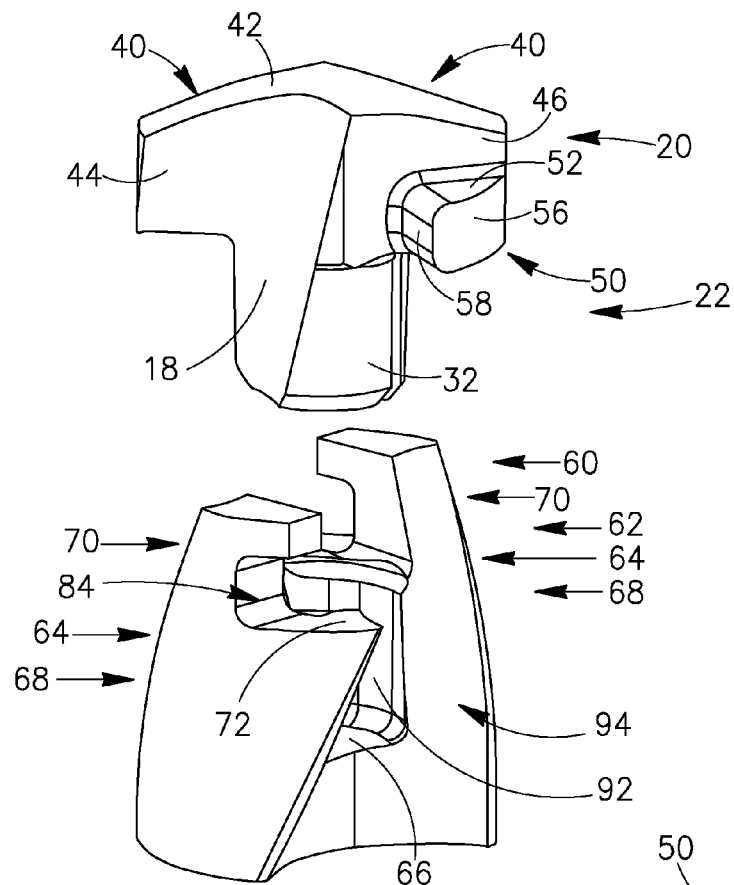
FIG. 3 is another exploded perspective view of the cutting tool of FIG. 1.
Figure 4:
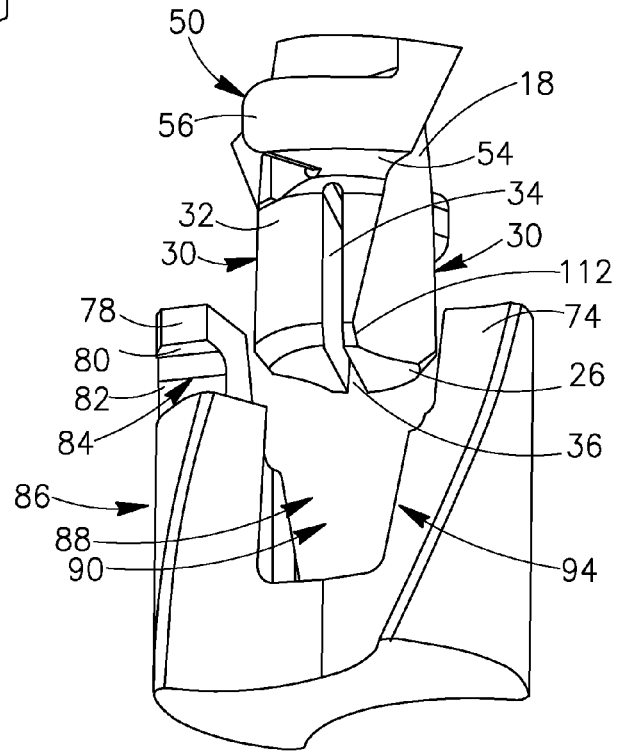
FIG. 4 is yet another exploded perspective view of the cutting tool of FIG. 1.

In FIGS. 2 to 4, the cutting tool 10 is shown disassembled with the cutting head 12 and the tool shank 14 separated from one another but aligned along the axis of rotation L in preparation for assembly. The axis of rotation L defines a forward to rear direction, with the cutting head 12 located at an axially forward end of the tool shank 14. The cutting head 12 comprises a cutting portion 20 and a cutting head coupling portion 22 forming a one-piece single unitary part with the cutting portion 20.

The cutting head coupling portion 22 comprises a male fixation member 24 extending in a rearward direction of the cutting portion 20 and terminating in a cutting head bottom surface 26. A resilience slit 28 divides the male fixation member 24 into two male fixation segments 30. Each male fixation segment 30 has a cutting head major fixation wall 32 separated from an associated cutting head minor fixation wall 32' by a head flute 18 which is recessed relative to the walls 32, 32'. In accordance with some embodiments, in the assembled tool, while the cutting head major fixation wall 32 of each male fixation segment 30 abuts the tool shank, the cutting head minor fixation wall 32' does not abut the tool shank. Generally speaking, the cutting head major fixation wall 32 is larger in the circumferential direction than its associated cutting head minor fixation wall 32'. For a given male fixation segment 30, the cutting head major fixation wall 32 forms a peripheral surface bounded by the resilience slit 28. The resilience slit 28 opens out to the cutting head major fixation wall 32 and cutting head minor fixation wall 32' at side apertures 34 and to the cutting head bottom surface 26 at a bottom aperture 36. The side apertures 34 and the bottom aperture 36 meet at bottom aperture ends 38.

In accordance with some embodiments, the cutting potion 20 comprises two rotationally spaced-apart head segments

40. Each head segment 40 has a top surface 42, a rotationally leading surface 44, facing the direction of rotation R, and a rotationally trailing surface 46, each connected to the top surface 42. The top surface 42 and the leading surface 44 meet at a cutting edge 48. Protruding from the rotationally trailing surface 46 is a transmission member 50 having an upper surface 52 facing in an axially forward direction, a base surface 54 facing in an axially rearward direction, an outwardly facing peripheral surface 56 extending between the upper and base surfaces 52, 54 and a cutting head torque transmission wall 58 generally facing opposite the direction of rotation R and located between the upper and base surfaces 52, 54.

The tool shank 14 has a tool shank forward end 60 in which the cutting head 12 is releasably mounted. In accordance with some embodiments, at the tool shank forward end 60, the tool shank 14 is provided with a protruding portion 62 having two rotationally spaced apart protrusions 64 extending forwardly from a tool shank bottom surface 66. Each protrusion 64 comprises a lower protruding portion 68 and an upper protruding portion 70. The lower protruding portion 68 has an axially forwardly facing axial support surface 72 from which the upper protruding portion 70 extends in an axially forward direction. The upper protruding portion 70 may be generally hook-shaped and bounded by a first surface 74 generally facing opposite the direction of rotation R, a second surface 76 joining the first surface 74 and generally facing in an axially forward direction, a third surface 78 joining the second surface 76 and generally facing the direction of rotation R, a lower surface 80 joining the third surface 78 and generally facing the axial support surface 72 and a tool shank torque transmission wall 82 generally facing the direction of rotation R and located between the lower surface 80 and the axial support surface 72. The lower surface 80, tool shank torque transmission wall 82 and axial support surface 72 form between them an opening which defines a transmission member receiving recess 84.

A tool shank coupling portion 86 is located at the tool shank forward end 60. The tool shank coupling portion 86 comprises a female fixation member 88 in the form of a tool shank pocket recess 90 bound by two tool shank fixation walls 92 which are inner peripheral surfaces of the lower protruding portions 68 and are separated by tool shank peripheral apertures 94. The tool shank fixation walls 92 extend away from the tool shank bottom surface 66.

In accordance with some embodiments, the cutting head major and tool shank fixation walls 32, 92 are arcuate in shape. In accordance with some embodiments, at least portions of one or both of the cutting head major and tool fixation walls 32, 92 lay on a cylindrical surface.

Figure 5:
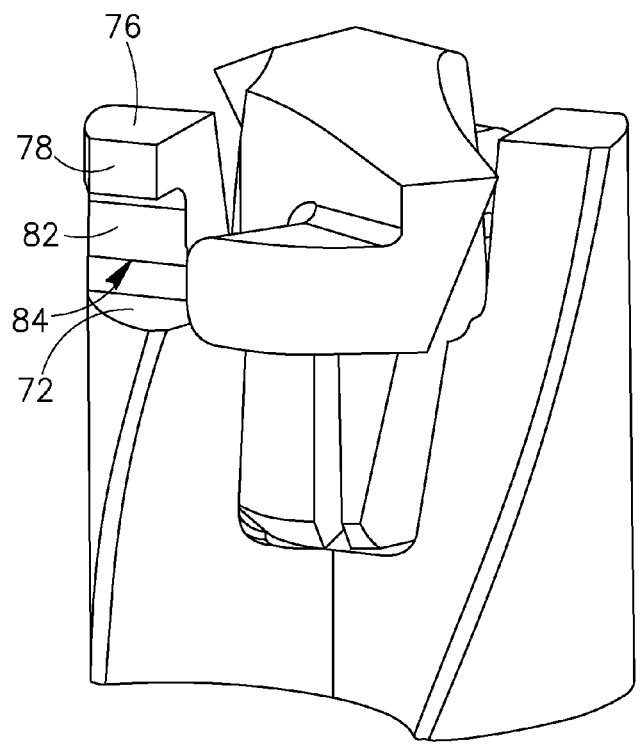
FIG. 5 is a perspective view of a the cutting tool of FIG. 1 partially assembled.

In FIG. 5, the cutting tool is partially assembled with the cutting head 12 and the tool shank 14 having been brought together along the axis of rotation L from their relative positions shown in FIG. 2. Thus, in FIG. 5, the cutting head 12 and the tool shank 14 are in the same rotational orientation about the axis of rotation L, as seen in FIG. 2, but with the male fixation member 24 located in the female fixation member 88.

Figure 6:
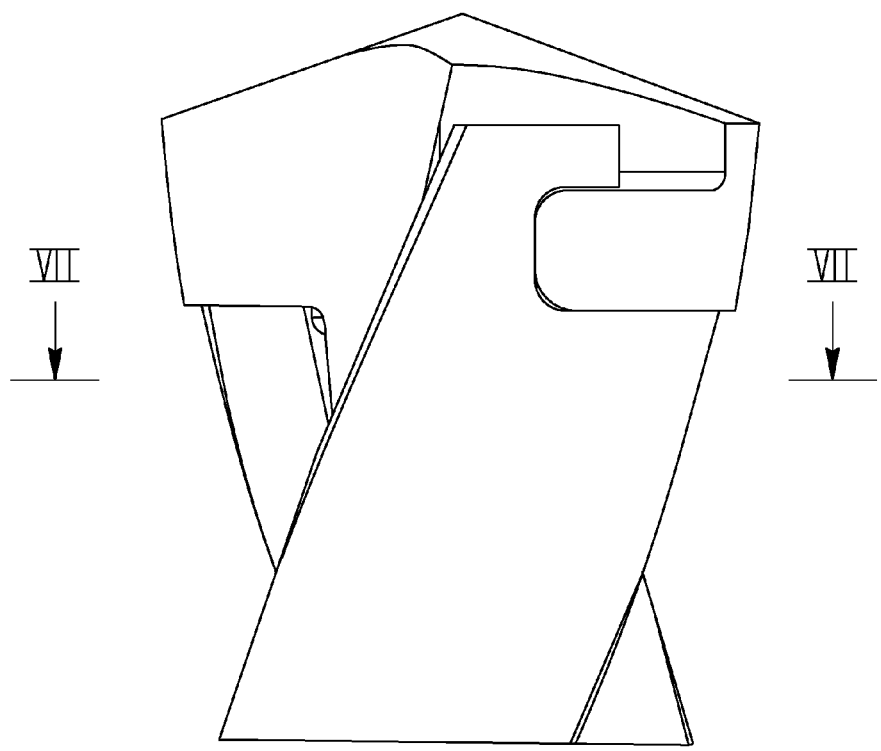
FIG. 6 is a side view of a the cutting tool of FIG. 1.

In FIG. 6 the cutting tool 10 is shown assembled with the cutting head 12 securely clamped in the tool shank 14. The assembled cutting tool 10 is obtained from the partially assembled configuration shown in FIG. 5 by rotating the cutting head 12 in a direction opposite the direction of rotation R, relative to the tool shank 14 with the transmission member 50 located in the transmission member receiving recess 84 until the cutting head torque transmission wall 58 abuts the tool shank torque transmission wall 82. In the assembled configuration, in addition to the cutting head torque transmission wall 58 abutting the tool shank torque transmission wall 82, the base surface 54 of the transmission member 50 abuts the axial support surface 72 providing axial support to the cutting head 12. In accordance with some embodiments, the cutting head bottom surface 26 does not abut the tool shank bottom surface 66 and the upper surface 52 of the transmission member 50 does not abut the lower surface 80 of the upper protruding portion 70.

Figure 7:
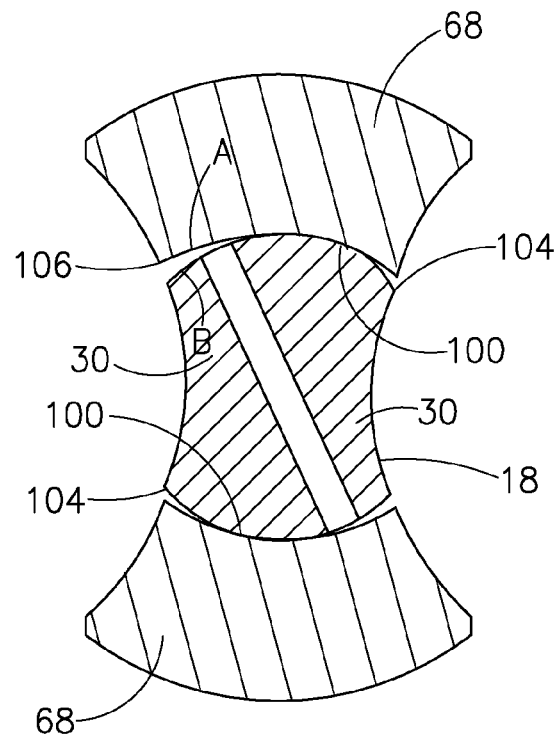
FIG. 7 is a cross-sectional view of the cutting tool taken along line VII-VII in FIG. 6.

Attention is now drawn to FIG. 7 showing a cross section of the cutting tool 10 taken perpendicular to the axis of rotation L in the lower protruding portion 68 of the tool shank coupling portion 86 and consequently through the male fixation member 24 of the cutting head 12. In some embodiments, in such a cross section each of the cutting head major fixation walls 32 has a head fixation wall arcuate sector 96 of length S1, and each of the tool shank fixation walls 92 has a tool shank fixation wall arcuate sector 98 of length S2. In some embodiments the length S2 is greater than length S1.

In some embodiments, in any given cross section, each of the cutting head major fixation walls 32 may have a circular sector of a given length. In some embodiments, the given length of each of the arcuate or circular sectors may be different in different cross sections. In some embodiments, in any given cross section the whole length of each of the cutting head major fixation walls 32 may be an arcuate or circular sector. Similarly, in some embodiments, in any particular cross section each of the tool shank fixation walls 92 may have an arcuate or circular sector of a particular length. In some embodiments, the particular length of the arcuate or circular sector may be different in different cross sections. In some embodiments, in any particular cross section the whole length of each of the tool shank fixation walls 92 may be an arcuate or circular sector.

As shown in FIG. 7, the male and female fixation members 24, 88 are configured such that, in the assembled tool, they abut each other at mutual abutment regions 100. In some embodiments, on the male fixation member, only the cutting head major fixation walls 32, and not the cutting head minor fixation walls 32' are configured to have abutment regions. In some embodiments, a given cutting head major fixation wall 32 abuts a corresponding tool shank fixation wall 92 at only one mutual abutment region 100. It is understood, however, that the axial extent of any such mutual abutment region 100 along the axis of rotation L need not extend along the entire length of the cutting head major fixation wall 32. In each cross section of the cutting tool 10 taken through mutual abutment regions 100 perpendicular to the axis of rotation L the cross sectional profiles of the mutual abutment regions 100 may be mutual arcuate sectors. In some embodiments, the mutual arcuate sectors may be circular sectors.

The male and female fixation members 24, 88 are designed to have an interference fit between them so that in the assembled configuration (FIGS. 6 and 7) the male fixation member 24 is securely held in the female fixation member 88. Such an interference fit between the male and female fixation members 24, 88 is achieved by designing the male and female fixation members 24, 88 so that the diameter of the male fixation member 24 is larger than the diameter of the female fixation member 88 at least some portions of the mutual abutment regions 100. The resilience slit 28 provides flexibility to the male fixation member 24 enabling the diameter of the male fixation member 24 (that is, the diameter in any cross section of the male fixation member 24 taken perpendicular to the axis of rotation L and through the resilience slit 28) to be made smaller by applying a force perpendicular to the resilience slit 28. On applying such a force the two male fixation segments 30 are moved closer to each other and a resilience force is set up in the male fixation member 24 which urges the male fixation segments 30 apart to their original position. If the applied force is not perpendicular to the resilience slit 28 then the force required to cause a given reduction in diameter will be greater.

Figure 8:
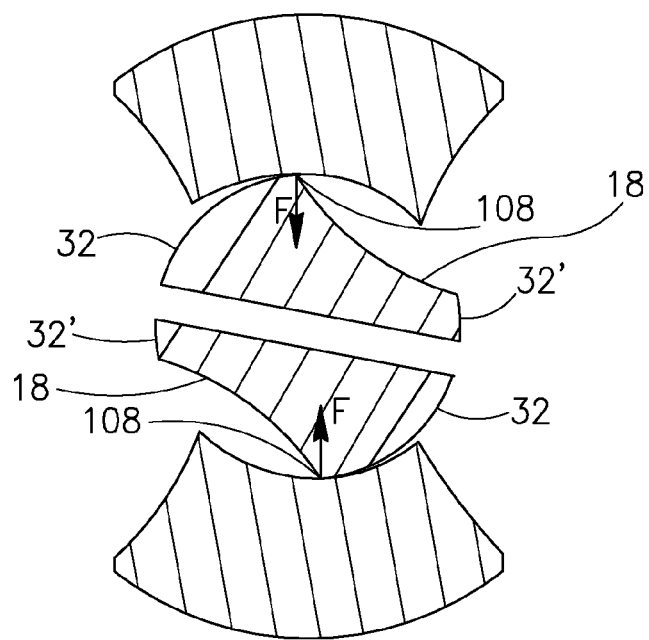
FIG. 8 is a cross-sectional view of the cutting tool similar to that of FIG. 7 but with the cutting head rotated to an intermediate position relative to the tool shank.
Figure 9:
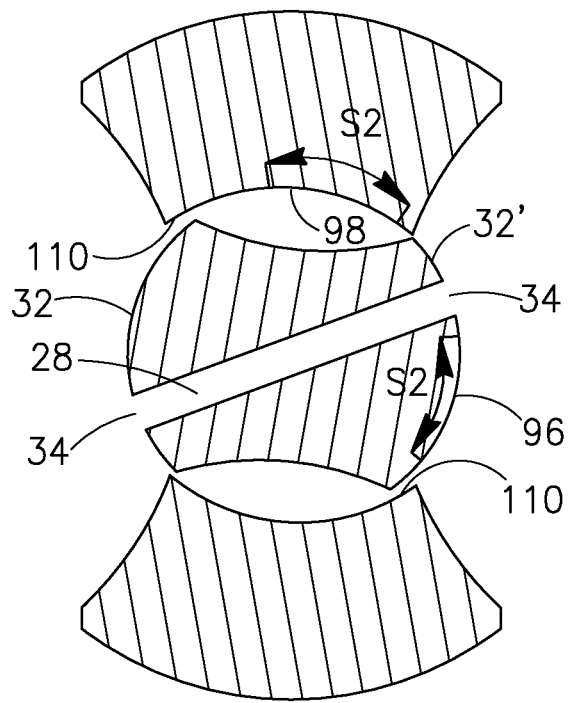
FIG. 9 is a cross-sectional view of the cutting tool similar to that of FIG. 7 but with the cutting head rotated by 90° relative to the tool shank.

In order to remove the cutting head 12 from the tool shank 14 from the assembled configuration as shown in FIG. 7, the cutting head 12 is rotated, relative to the tool shank 14, in the direction of rotation R by 90°, via an intermediate position shown in FIG. 8, to a partially assembled configuration shown in FIG. 9, which is equivalent to the configuration shown in FIG. 5. In the partially assembled configuration shown in FIG. 9 the cutting head 12 can be removed from the tool shank 14 by moving the cutting head 12 and tool shank 14 apart along the axis of rotation L arriving at the dismantled configuration shown in FIG. 2.

In order to mount the cutting head 12 on the tool shank 14 and securely affix it thereto, a set of operations opposite to that described above is performed. That is, starting from the disassembled configuration shown in FIG. 2 with the cutting head 12 and the tool shank 14 separated from one another but aligned along the axis of rotation L the cutting head 12 and the tool shank 14 are brought together along the axis of rotation L until the male fixation member 24 is located in the female fixation member 88 as shown in FIG. 9. The cutting head 12 is then rotated, relative to the tool shank 14, in the direction opposite the direction of rotation R, by 90°, via the intermediate position shown in FIG. 8, to the assembled configuration shown in FIG. 7.

In some embodiments, the intermediate position shown in FIG. 8 is the position of first contact between the cutting head 12 and the tool shank 14 during the assembly of the cutting tool 10. In such embodiments, the point of first contact between the cutting head major fixation walls 32 and the tool shank fixation walls 92 during the assembly of the cutting tool 10 is not between a leading extremity 104 of each of the cutting head major fixation walls 32 and an associated trailing extremity 106 of each of the tool shank fixation walls 92 but between the leading extremity 104 of each of the cutting head major fixation walls 32 and an inner point 108 on each associated tool shank fixation wall 92. In some embodiments, this is achieved by forming chamfered portions 110 at an adjacent the trailing extremity 106 of each of the tool shank fixation walls 92. Consequently, during assembly, initial frictional contact between the male and female fixation members 24, 88 is made along the head and tool shank fixation wall arcuate sectors 96, 98 (or, circular sectors in some embodiments), starting at the circumferentially inner point 108 of each tool shank fixation wall 92 (in a given cross section), but is avoided at the chamfered portions 110.

As the male fixation member 24 is rotated from the partially assembled configuration (FIGS. 5 and 9) by rotating the cutting head 12 in a direction opposite the direction of rotation R relative to the tool shank 14, the male fixation segments 30 are forced towards each other since the diameter of the male fixations member 24 is initially larger than the diameter of the female fixation member 88 and a resilience force is set up in the male fixation member 24. Consequently, force has to be applied to rotate the cutting head 12 relative to the tool shank 14 to overcome frictional forces acting between the two.

In accordance with some embodiments, the resilience slit 28 is directed so that during initial contact between the leading extremity 104 of each of the cutting head major fixation walls 32 and the inner point 108 on each associated tool shank fixation wall 92, the force F acting on the male fixation member 24, to overcome the resilience force, is substantially perpendicular to the resilience slit 28 (see FIG. 8), whereby the force required to rotate the cutting head 12 relative to the tool shank 14 is less than if the force acting on the male fixation member 24 was not substantially perpendicular to the resilience slit 28. Moreover, with the resilience slit 28 directed as shown in the figures, the resilience slit 28 does not open out to the head flute 18 and therefore in the assembled configuration of the cutting tool 10, as shown in FIG. 1, chips cut from a workpiece cannot enter the resilience slit 28.

Figure 10:
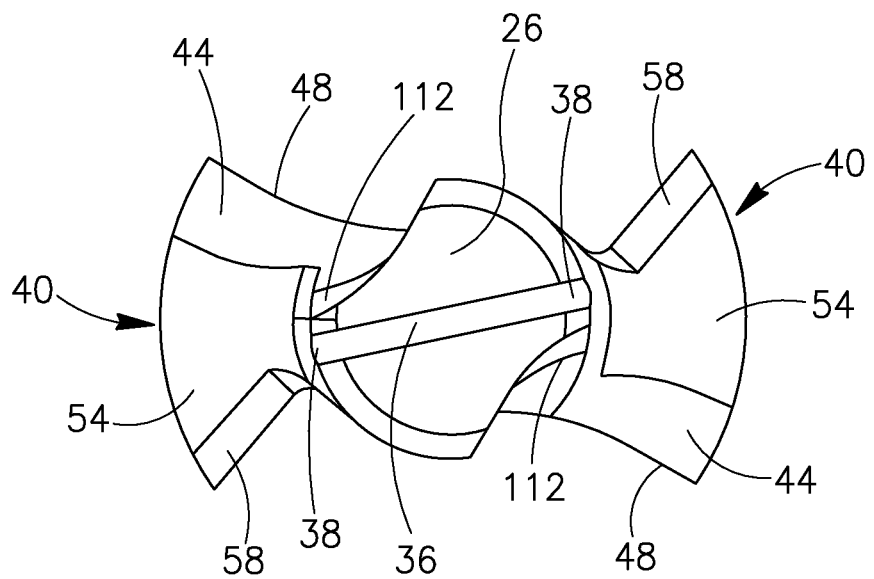
FIG. 10 is a bottom view of the cutting head in accordance with some embodiments of the invention.

Attention is now drawn to FIG. 10 showing a bottom view of the cutting head 12 showing the orientation of the resilience slit 28 in accordance with some embodiments of the invention. In accordance with some embodiments, the bottom aperture ends 38 are adjacent, but not coincident with, rotationally trailing edges 112 of respective head flutes 18.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool (10) having an axis of rotation (L) around which the cutting tool (10) rotates in a direction of rotation (R), the cutting tool (10) comprising:
a tool shank (14) having a forward end (60) provided with a female fixation member (88); and
a replaceable self-clamping cutting head (12) provided with a male fixation member (24); wherein:
the male fixation member (24) has a resilience slit (28);
the replaceable cutting head is resiliently secured to the forward end (60) of the tool shank (14) by an interference fit between the male fixation member (24) and the female fixation member (88) at mutual abutment regions (100);
in each cross section of the cutting tool (10) taken perpendicular to the axis of rotation (L) through the mutual abutment regions (100), cross sectional profiles of the mutual abutment regions (100) comprise mutual arcuate sectors;
a transmission member (50) protrudes from a rotationally trailing surface (46) of the cutting head (12);
the transmission member (50) has an upper surface (52) facing in an axially forward direction, a base surface (54) facing in an axially rearward direction, and a cutting head torque transmission wall (58) generally facing opposite the direction of rotation (R) and located between the upper and base surfaces (52, 54).

2. The cutting tool according to claim 1, wherein the cutting head (12) is made of cemented carbide.

3. The cutting tool according to claim 1, wherein the tool shank (14) is made of cemented carbide.

4. The cutting tool according to claim 1, wherein the cutting head (12) and the tool shank (14) are made of cemented carbide.

5. The cutting tool according to claim 1, wherein the mutual arcuate sectors are mutual circular sectors.

6. The cutting tool according to claim 1, wherein:
the cutting head (12) comprises a cutting portion (20) and a cutting head coupling portion (22) forming a one-piece single unitary part with the cutting portion (20);
the cutting head coupling portion (22) comprises the male fixation member (24) extending in a rearward direction of the cutting portion (20) and terminating in a cutting head bottom surface (26);

the resilience slit (28) divides the male fixation member (24) into two male fixation segments (30) each having a cutting head major fixation wall (32) forming a peripheral surface bounded by the resilience slit (28); and the resilience slit (28) opens out to the cutting head major fixation walls (32) at side apertures (34) and to the cutting head bottom surface (26) at a bottom aperture (36).

7. The cutting tool according to claim 6, wherein:

the side apertures (34) and the bottom aperture (36) meet at bottom aperture ends (38); and the bottom aperture ends (38) are adjacent, but not coincident with, rotationally trailing edges (112) of respective head flutes (18).

8. The cutting tool according to claim 6, wherein:

the tool shank (14) is provided, at the tool shank forward end (60), with a protruding portion (62) having two rotationally spaced apart protrusions (64) extending forwardly from a tool shank bottom surface (66); and the cutting head bottom surface (26) does not abut the tool shank bottom surface (66).

9. The cutting tool according to claim 1, wherein:

the tool shank (14) is provided, at the tool shank forward end (60), with a protruding portion (62) having two rotationally spaced apart protrusions (64) extending forwardly from a tool shank bottom surface (66);

each protrusion (64) comprises a lower protruding portion (68) and an upper protruding portion (70);

the lower protruding portion (68) has an axially forwardly facing axial support surface (72) from which the upper protruding portion (70) extends in an axially forward direction;

the upper protruding portion (70) and the lower protruding portion (68) form a transmission member receiving recess (84) comprising a tool shank torque transmission wall (82) generally facing the direction of rotation (R) and an axially facing axial support surface (72);

the cutting head torque transmission wall (58) abuts the tool shank torque transmission wall (82); and the base surface (54) of the transmission member (50) abuts the axial support surface (72) providing axial support to the cutting head (12).

10. The cutting tool according to claim 9, wherein:

the upper protruding portion (70) comprises a lower surface (80) generally facing the axial support surface (72);

the tool shank torque transmission wall (82) is located between the lower surface (80) and the axial support surface (72); and the upper surface (52) of the transmission member (50) does not abut the lower surface (80) of the upper protruding portion (70).

11. A cutting tool (10) having an axis of rotation (L) around which the cutting tool (10) rotates in a direction of rotation (R), the cutting tool (10) comprising:

a tool shank (14) having a forward end (60) provided with a female fixation member (88); and a replaceable self-clamping cutting head (12) provided with a male fixation member (24); wherein:

the male fixation member (24) has a resilience slit (28);

the replaceable cutting head is resiliently secured to the forward end (60) of the tool shank (14) by an interference fit between the male fixation member (24) and the female fixation member (88) at mutual abutment regions (100);

in each cross section of the cutting tool (10) taken perpendicular to the axis of rotation (L) through the mutual abutment regions (100), cross sectional profiles of the mutual abutment regions (100) comprise mutual arcuate sectors;

the resilience slit (28) divides the male fixation member (24) into two male fixation segments (30) each having a cutting head major fixation wall (32);

the female fixation member (88) comprises two tool shank fixation walls (92);

each cutting head major fixation wall (32) abuts a corresponding tool shank fixation wall (92); and a trailing extremity (106) of each tool shank fixation wall (92) is provided with a chamfered portion (110) so that, during assembly, initial frictional contact between the cutting head major fixation walls (32) and the tool shank fixation walls (92) starts at a circumferentially inner point (108) along each tool shank fixation wall (92).

12. A cutting tool (10) having an axis of rotation (L) around which the cutting tool (10) rotates in a direction of rotation (R), the cutting tool (10) comprising:

a tool shank (14) having a forward end (60) provided with a female fixation member (88); and a replaceable self-clamping cutting head (12) provided with a male fixation member (24); wherein:

the male fixation member (24) has a resilience slit (28);

the replaceable cutting head is resiliently secured to the forward end (60) of the tool shank (14) by an interference fit between the male fixation member (24) and the female fixation member (88) at mutual abutment regions (100);

in each cross section of the cutting tool (10) taken perpendicular to the axis of rotation (L) through the mutual abutment regions (100), cross sectional profiles of the mutual abutment regions (100) comprise mutual arcuate sectors;

the cutting head (20) has a head flute (18) which extends in a rearward direction into a periphery of the male fixation member (24);

the resilience slit (28) divides the male fixation member (24) into two male fixation segments (30);

each male fixation segment (30) comprises a cutting head major fixation wall (32) separated from an associated cutting head minor fixation wall (32') by the head flute (18).

13. The cutting tool according to claim 12, wherein:

the cutting head major fixation walls (32) abut the tool shank (14); and the cutting head minor fixation walls (32') do not abut the tool shank (14).

14. The cutting tool according to claim 12, wherein:

in a given male fixation segment (30), the cutting major head fixation wall (32) is larger in a circumferential direction than its associated cutting head minor fixation wall (32').

15. The cutting tool according to claim 12, wherein:

the resilience slit (28) comprises side apertures (34) and a bottom aperture (36) which meet at bottom aperture ends (38); and the bottom aperture ends (38) are adjacent, but not coincident with, rotationally leading edges (112) of respective head flutes (18).

16. The cutting tool according to claim 12, wherein:

a transmission member (50) protrudes from a rotationally trailing surface (46) of the cutting head (12);

the transmission member (50) has an upper surface (52) facing in an axially forward direction, a base surface (54) facing in an axially rearward direction, and a cutting head torque transmission wall (58) generally facing opposite the direction of rotation (R) and located between the upper and base surfaces (52, 54).

17. The cutting tool according to claim 16, wherein:
the tool shank (14) is provided, at the tool shank forward end (60), with a protruding portion (62) having two rotationally spaced apart protrusions (64) extending forwardly from a tool shank bottom surface (66);
each protrusion (64) comprises a lower protruding portion (68) and an upper protruding portion (70);
the lower protruding portion (68) has an axially forwardly facing axial support surface (72) from which the upper protruding portion (70) extends in an axially forward direction;
the upper protruding portion (70) and the lower protruding portion (68) form a transmission member receiving recess (84) comprising a tool shank torque transmission wall (82) generally facing the direction of rotation (R) and an axially facing axial support surface (72);
the cutting head torque transmission wall (58) abuts the tool shank torque transmission wall (82); and
the base surface (54) of the transmission member (50) abuts the axial support surface (72) providing axial support to the cutting head (12).

18. The cutting tool according to claim 17, wherein:
the upper protruding portion (70) comprises a lower surface (80) generally facing the axial support surface (72);
the tool shank torque transmission wall (82) is located between the lower surface (80) and the axial support surface (72); and
the upper surface (52) of the transmission member (50) does not abut the lower surface (80) of the upper protruding portion (70).

19. A cutting tool (10) having an axis of rotation (L) around which the cutting tool (10) rotates in a direction of rotation (R), the cutting tool (10) comprising:
a tool shank (14) having a forward end (60) provided with a female fixation member (88); and
a self-clamping cutting head (12) comprising:
a cutting portion (20);
a cutting head coupling portion (22) forming a one-piece single unitary part with the cutting portion (20), the cutting head coupling portion (22) comprising a male fixation member (24) extending in a rearward direction of the cutting portion (20) and terminating in a cutting head bottom surface (26);
head flutes (18) extending in a rearward direction into a periphery of the male fixation member (24); and
a resilience slit (28) dividing the male fixation member (24) into two male fixation segments (30); wherein:
each male fixation segment (30) comprises a cutting head major fixation wall (32) separated from an associated cutting head minor fixation wall (32') by one of the head flutes (18);

wherein:
the self-clamping cutting head is resiliently secured to the forward end (60) of the tool shank (14) by an interference fit between the male fixation member (24) and the female fixation member (88) at mutual abutment regions (100); and
in each cross section of the cutting tool (10) taken perpendicular to the axis of rotation (L) through the mutual abutment regions (100), cross sectional profiles of the mutual abutment regions (100) comprise mutual arcuate sectors.

20. The cutting tool according to claim 19, wherein:
a transmission member (50) protrudes from a rotationally trailing surface (46) of the cutting head (12);
the transmission member (50) has an upper surface (52) facing in an axially forward direction, a base surface (54) facing in an axially rearward direction, and a cutting head torque transmission wall (58) generally facing opposite the direction of rotation (R) and located between the upper and base surfaces (52, 54).

21. The cutting tool according to claim 20, wherein:
the tool shank (14) is provided, at the tool shank forward end (60), with a protruding portion (62) having two rotationally spaced apart protrusions (64) extending forwardly from a tool shank bottom surface (66);
each protrusion (64) comprises a lower protruding portion (68) and an upper protruding portion (70);
the lower protruding portion (68) has an axially forwardly facing axial support surface (72) from which the upper protruding portion (70) extends in an axially forward direction;
the upper protruding portion (70) and the lower protruding portion (68) form a transmission member receiving recess (84) comprising a tool shank torque transmission wall (82) generally facing the direction of rotation (R) and an axially facing axial support surface (72);
the cutting head torque transmission wall (58) abuts the tool shank torque transmission wall (82); and
the base surface (54) of the transmission member (50) abuts the axial support surface (72) providing axial support to the cutting head (12).

22. The cutting tool according to claim 21, wherein:
the upper protruding portion (70) comprises a lower surface (80) generally facing the axial support surface (72);
the tool shank torque transmission wall (82) is located between the lower surface (80) and the axial support surface (72); and
the upper surface (52) of the transmission member (50) does not abut the lower surface (80) of the upper protruding portion (70).

* * * * *